United States Patent Office 3,390,215
Patented June 25, 1968

3,390,215
FOAM-FILLED NYLON ARTICLE AND
METHOD OF MAKING THE SAME
Herbert J. Pike, Basking Ridge, N.J., assignor to Allied
Chemical Corporation, New York, N.Y., a corporation
of New York
No Drawing. Filed Feb. 6, 1964, Ser. No. 343,127
1 Claim. (Cl. 264—45)

ABSTRACT OF THE DISCLOSURE

A method for reinforcing the walls of a hollow nylon object comprising injecting foamable urethane into said hollow object. The foamable urethane is at its incipient foam point and maintained between 60° C. and 90° C. The preferred urethane is a polyether having an hydroxyl number between 350 and 450, dibutyl tin dilaurate, a blowing agent and an isocyanate having a density of 2.0 lb./ft.$^3$.

This invention relates to foam-filled reinforced plastic objects and more particularly to hollow nylon objects reinforced with plastic foams such as urethanes and a process therefor.

In my copending application Ser. No. 248,996, entitled, Process for the Production of Hollow Articles of Polymerized Lactams, assigned to the assignee hereof, in which E. C. Schule is a coinventor, there is described a process for casting hollow thermoplastic materials e.g. nylon to obtain therefrom hollow nylon objects. In accordance with the disclosure therein a hollow seamless thermoplastic object can be prepared which has, due to the process techniques, reinforced walls of thermoplastic material, if desired. When anionic nylon is the specific thermoplastic material, there is provided an object found to have better impact strength than cast conventional nylon objects together with substantial uniform construction, tensile strength and the like.

It is an object of my invention to provide reinforced nylon structures.

It is a further object of my invention to provide a method of adhering inexpensive foams to nylon to obtain therefrom products which can withstand impacts substantially higher than the hollow objects themselves.

It is a still further object of my invention to provide a foam-filled hollow nylon object with extremely thin nylon walls $\frac{1}{32}$ to $\frac{1}{64}$ inch thick yet capable of withstanding substantial impact due to the strength provided by the foam constituent.

Other objects and advantages will become more apparent from the following complete description and claim.

In accordance with my invention a hollow nylon object is provided with reinforced inside walls by injecting therein a foaming composition, said composition being at its incipient foam point and regulating the temperature of the hollow nylon object so as to induce foaming of the foam composition within the nylon object.

Various foam compositions as well as the method of producing the same are well known in the art. These compositions include styrene foam, polyester foam, epoxy foam and most particularly polyurethane foam. The latter comes in various densities and is either rigid or non-rigid. It is produced by the reaction of compounds of the isocyanate class with polyethers in the presence of a blowing agent. It has good thermal properties and is useful as insulation and the like. In the process of this invention, i.e., in situ, foaming of a foaming composition or compound within a hollow nylon, preferably seamless, article any of the ingredients used to obtain the above foam compositions can be used to prepare a foamed-hollow nylon object but the ingredients used to prepare polyurethane foam are preferred.

The process of this invention may be carried out at any temperature sufficient to permit foaming of the foaming composition within the walls of the hollow nylon object. For instance, in the case of urethane foaming ingredients, the process of this invention can be performed at room temperature but this temperature is not preferred because at temperatures less than 60° C. say at 50° C. the foam thereby prepared will have an uneven cell structure and the cells will be too small to provide a finished reinforced nylon object with substantially increased impact strength. Conversely, if the foaming is performed at temperatures above 90° C. in the case of a urethane foaming composition, the cell structure of the resultant foam will be nonuniform, i.e., the foam will consist of both small and large cells with the undesirable consequence of poor distribution of weight. This poor distribution of weight does not increase the impact strength of the resultant foam filled nylon object as significantly as if the foaming were performed at temperatures within the 60° C. to 90° C. preferred range.

The term "incipient foam point" as used herein refers to a condition of the foaming composition, i.e., when the foaming composition is just about to foam. To illustrate, in preparing a foaming composition urethane foam to be injected into a hollow nylon object, one method is to mix together a polyether having an hydroxyl number between 350 and 450 with silicone oil and a blowing agent such as a fluorinated hydrocarbon at a slow speed say 100–500 r.p.m. for about 2 hours. In small batches, mixing speeds substantially higher than this may cause heat up of the mixture with premature foaming. To this mix is added dibutyl tin dilaurate and an isocyanate and mixing is continued in a high speed mixer at say 6,000 r.p.m. until the material becomes viscous as visible to the naked eye and appears to be about to foam. At that time the "incipient foam point" is reached and the foaming composition is ready for injection into the hollow nylon object.

When the foaming composition is injected into the hollow nylon object foaming occurs shortly thereafter. In the case of a urethane foaming composition, foaming is complete within about 5 seconds. The light weight foam adheres readily to the inside nylon walls and fills the complete void. The finished object has a substantially increased impact strength even in the case where the walls of the nylon object are extremely thin, $\frac{1}{32}$ to $\frac{1}{64}$ inch. To illustrate, I have discovered that by using my process, it is possible to produce a hollow nylon bowling pin, the hollow being filled by one of the above foams, preferably urethane foam wherein the walls are only $\frac{1}{32}''$ thick. This bowling pin could then withstand the full impact of bowling balls without any deleterious effect. The impact strength of a nylon wall $\frac{1}{32}''$ thick having adhered thereto a 1½ inch layer of foam, I have found, is at least equivalent to a nylon sheet ½ inch thick. Thus, the process of this invention provides a significant cost advantage when nylon articles having high impact strength are desired since the cost of providing a hollow nylon object having $\frac{1}{32}''$ thick walls and an interior foam of 1¼ inches thick is substantially less than providing a nylon article having ½ inch thick walls.

In order to more fully illustrate the nature of this invention and the manner of practicing the same, the following example is set forth.

EXAMPLE 1

A hollow seamless nylon cup having inner and outside walls ranging in thickness between $\frac{1}{32}$ inch to $\frac{1}{64}$ inch and being hollow between the walls was preheated to between 60 and 90° C. 100 parts of commercially available polyether marketed by Union Carbide Corporation under "Niax" Triol LK–380, an aromatic base propylene oxide polyether with a hydroxyl number between 370 and 390, the polyether believed to be more specifically a trishydroxyphenylpropane condensed with 1,2-propylene oxide and its viscosity reduced with a propoxylated glycerine was mixed with 0.9 part of silicone oil and 25.0 parts of trichloromonofluoromethane blowing agent. The ingredients were mixed together by use of a mixer operating at between 100 and 500 r.p.m. at room temperature. After these ingredients were mixed for about 2 hours, 0.7 part dibutyl tin dilaurate was added to the mixture together with 60.3 parts of a toluene disocyanate mixture containing 88% of the 2,4-isomer and 12% of the 2,6-isomer. The speed of the mixer was increased to about 6,000 r.p.m. until the foaming composition attained its incipient foam point, i.e., it appeared ready to foam. The material was then poured into an opening provided at the base of the cup. Foaming commenced within the cup almost immediately and was complete in about 5 seconds. The density of the foam produced was 2.0 lb./ft.$^3$ at standard temperature and pressure.

The cup was examined and found to have excellent impact strength. The cup was cut open to examine the foam interior. Examination showed excellent adhesion of the foam to the nylon walls with good cell distribution throughout. The foam filled the complete hollow void reaching into crevices where the inside and outside walls of the cup met i.e. at the lip of the cup.

It is readily seen therefore that the instant invention provides foam-filled hollow nylon articles where the impact strength of the nylon can be increased significantly by use of inexpensive foaming compositions, particularly urethane foaming compositions. Other advantages flowing from my discovery are apparent from the foregoing. These include use of foaming compositions and/or nylon in areas not heretofore thought possible.

Since the above disclosure has been set forth merely to indicate the nature of this invention and the manner of practicing the same and not for purposes of limiting the same, certain modifications and departures will be obvious to one skilled in the art. Therefore, the instant invention should be construed only in the light of its spirit and scope using the appended claim as a guide thereto.

I claim:
1. A method of providing a foam-filled reinforced plastic object comprising the steps of:
   providing a hollow nylon bowling pin having a wall thickness of about 1/64 to 1/32 inch thick and preheating said nylon object to a temperature ranging from 60° C. to 90° C.;
   injecting therein a foamable urethane composition being at its incipient foam point,
   said foamable urethane composition comprising a premix of
      about 100 parts of a propylene oxide polyether having a hydroxyl number ranging from about 370 to 390,
      about 0.7 part of dibutyl tin dilaurate, about 60 parts of a toluene diisocyanate mixture containing about 88% of the 2,4-isomer and about 12% of the 2,6-isomer,
      about 25 parts of trichloromonofluromethane blowing agent;
   and allowing said foamable urethane composition to foam and cure within said nylon object to a foam having a density of about 2.0 lbs./ft.$^3$ and substantially uniform cell size from the skin throughout.

References Cited
UNITED STATES PATENTS

| | | | |
|---|---|---|---|
| 3,147,975 | 9/1964 | Gruss et al. | 273—82 |
| 3,158,529 | 11/1964 | Robitschek et al. | 161—161 |
| 3,174,887 | 3/1965 | Voelker | 156—79 |
| 3,233,576 | 2/1966 | Voelker | 156—79 X |

OTHER REFERENCES

Du Pont Publications, "Rigid Urethane Foams, Methods of Application," June 1957, Wilmington, Del., page 4 and cover page; Bulletin HR–31, July 1958, cover page and pages 2, 3; and Bulletin HR–32, September 1958, cover and pages 23, 24.

EARL M. BERGERT, *Primary Examiner.*

C. B. COSBY, *Assistant Examiner.*